US008127063B2

(12) United States Patent
Sherriff et al.

(10) Patent No.: US 8,127,063 B2
(45) Date of Patent: Feb. 28, 2012

(54) DISTRIBUTED EQUIPMENT ARBITRATION IN A PROCESS CONTROL SYSTEM

(75) Inventors: Godfrey Roland Sherriff, Austin, TX (US); Gary Keith Law, Georgetown, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 12/356,385

(22) Filed: Jan. 20, 2009

(65) Prior Publication Data

US 2010/0185801 A1 Jul. 22, 2010

(51) Int. Cl.
*G06F 12/00* (2006.01)
*G06F 13/14* (2006.01)
*G06F 13/38* (2006.01)
*G06F 19/00* (2006.01)
*G06F 9/46* (2006.01)
*G05B 11/01* (2006.01)

(52) U.S. Cl. ............ 710/244; 710/242; 700/19; 700/20; 700/99; 700/100; 700/101; 700/102; 718/103; 718/104

(58) Field of Classification Search .................. 710/242, 710/244, 240; 700/19, 20, 99–102; 718/103, 718/104
See application file for complete search history.

(56) References Cited

U.S. PATENT DOCUMENTS

| | | | | |
|---|---|---|---|---|
| 4,395,757 A | * | 7/1983 | Bienvenu et al. ............ | 718/104 |
| 5,193,189 A | * | 3/1993 | Flood et al. .................. | 718/103 |
| 5,301,333 A | * | 4/1994 | Lee .............................. | 710/244 |
| 5,870,572 A | * | 2/1999 | Garcia ......................... | 710/310 |
| 6,347,352 B1 | * | 2/2002 | Jeddeloh et al. ............. | 710/243 |
| 6,411,815 B1 | * | 6/2002 | Balasuriya ................... | 455/512 |
| 6,522,934 B1 | * | 2/2003 | Irwin et al. .................. | 700/11 |

(Continued)

FOREIGN PATENT DOCUMENTS

EP 617368 A1 * 9/1994

(Continued)

OTHER PUBLICATIONS

"NN87044976: Interactive Work Station With Auxiliary Microprocessor for Storage Protection", Apr. 1, 1987, IBM, IBM Technical Disclosure Bulletin, vol. 29, Iss. 11, pp. 4976-4982.*

(Continued)

*Primary Examiner* — Faisal M Zaman
(74) *Attorney, Agent, or Firm* — Marshall, Gerstein & Borun LLP

(57) ABSTRACT

A distributed process control equipment ownership arbitration system and method for arbitrating equipment ownership conflicts are disclosed. Individual control modules representing various process control entities within a process control system define a plurality of lists or queues for storing equipment arbitration information. Requests by one process control entity to acquire ownership over another process control entity are represented by an arbitration token that represents the ownership relationship sought by the acquiring process control entity. Copies of the arbitration token are communicated between the respective control modules and stored in the various arbitration queues defined by the control modules, depending on the status of the acquisition request. Upon receiving an acquisition request from another process control entity, the control module associated with the targeted process control entity decides whether the targeted process control entity is available to be acquired by the requesting control entity based on arbitration rules that are embedded within the control module itself. Once the targeted process control entity has been acquired by another process control entity it may not be acquired by any other process control entity until it has been released by the acquiring process control entity.

36 Claims, 7 Drawing Sheets

U.S. PATENT DOCUMENTS

| | | | |
|---|---|---|---|
| 6,529,984 B1 * | 3/2003 | Teener et al. | 710/240 |
| 6,549,972 B1 * | 4/2003 | Berstis et al. | 710/311 |
| 6,636,915 B1 * | 10/2003 | Dabby et al. | 710/240 |
| 6,647,301 B1 * | 11/2003 | Sederlund et al. | 700/79 |
| 6,651,128 B1 * | 11/2003 | Gulick | 710/309 |
| 6,957,301 B2 * | 10/2005 | Deenadhayalan et al. | 711/112 |
| 6,983,461 B2 * | 1/2006 | Hutchison et al. | 718/104 |
| 6,999,997 B2 * | 2/2006 | Clarke et al. | 709/213 |
| 7,047,370 B1 * | 5/2006 | Jeter et al. | 711/154 |
| 7,072,354 B1 * | 7/2006 | Beathard | 370/447 |
| 7,093,251 B2 * | 8/2006 | Tsun et al. | 718/100 |
| 7,272,834 B2 * | 9/2007 | Bauman et al. | 719/314 |
| 7,315,912 B2 * | 1/2008 | Reed | 710/310 |
| 7,334,102 B1 * | 2/2008 | Conway | 711/163 |
| 7,403,945 B2 * | 7/2008 | Lin et al. | 1/1 |
| 7,451,258 B1 * | 11/2008 | Hiratzka et al. | 710/111 |
| 7,680,970 B2 * | 3/2010 | Sherriff et al. | 710/240 |
| 7,707,179 B2 * | 4/2010 | Holt | 707/620 |
| 2003/0100957 A1 * | 5/2003 | Chaffee et al. | 700/18 |
| 2003/0140087 A1 * | 7/2003 | Lincoln et al. | 709/201 |
| 2004/0230328 A1 * | 11/2004 | Armstrong et al. | 700/83 |
| 2004/0249997 A1 * | 12/2004 | Umberhocker et al. | 710/29 |
| 2005/0065626 A1 * | 3/2005 | Kappelhoff et al. | 700/97 |
| 2006/0031619 A1 * | 2/2006 | Nguyen et al. | 710/305 |
| 2006/0047873 A1 * | 3/2006 | Bose et al. | 710/243 |
| 2006/0089739 A1 * | 4/2006 | Sherriff et al. | 700/99 |
| 2006/0117123 A1 * | 6/2006 | Izumida | 710/244 |
| 2006/0274658 A1 * | 12/2006 | Verchere et al. | 370/238 |
| 2007/0083869 A1 * | 4/2007 | Bera | 718/104 |
| 2007/0294448 A1 * | 12/2007 | Nozaki et al. | 710/240 |
| 2007/0294450 A1 * | 12/2007 | Rudnick et al. | 710/244 |
| 2008/0010284 A1 * | 1/2008 | Beck | 707/8 |
| 2008/0098401 A1 * | 4/2008 | Weatherhead et al. | 718/104 |
| 2010/0083262 A1 * | 4/2010 | Gulati et al. | 718/102 |

FOREIGN PATENT DOCUMENTS

| | | | |
|---|---|---|---|
| EP | 2209055 A2 * | 7/2010 | |
| JP | 02146660 A * | 6/1990 | |
| JP | 2006139773 A * | 6/2006 | |
| JP | 2010170545 A * | 8/2010 | |
| WO | WO 9706503 A1 * | 2/1997 | |
| WO | WO-2007/146898 A2 | 12/2007 | |
| WO | WO 2010150654 A1 * | 12/2010 | |

OTHER PUBLICATIONS

Jasper, W.J.; Reddy, M.Y.; , "Real-time system for data acquisition and control of batch dyeing ," Textile, Fiber and Film Industry Technical Conference, 1994., IEEE 1994 Annual , pp. 1-5, May 4-5, 1994.*

Keating, D.; McInnes, A.; Hayes, M.; , "Model Checking a TTCAN Implementation," Software Testing, Verification and Validation (ICST), 2011 IEEE Fourth International Conference on , pp. 387-396, Mar. 21-25, 2011.*

Fang Li; Lifang Wang; Chenglin Liao; , "CAN(Controller Area Network) Bus Communication System Based on Matlab/Simulink," Wireless Communications, Networking and Mobile Computing, 2008. WiCOM '08. 4th International Conference on , pp. 1-4, Oct. 12-14, 2008.*

Great Britain Search Report for Application No. GB1000873.8, dated Apr. 22, 2010.

European Search Report for Application No. 10 15 1188, dated May 23, 2011.

* cited by examiner

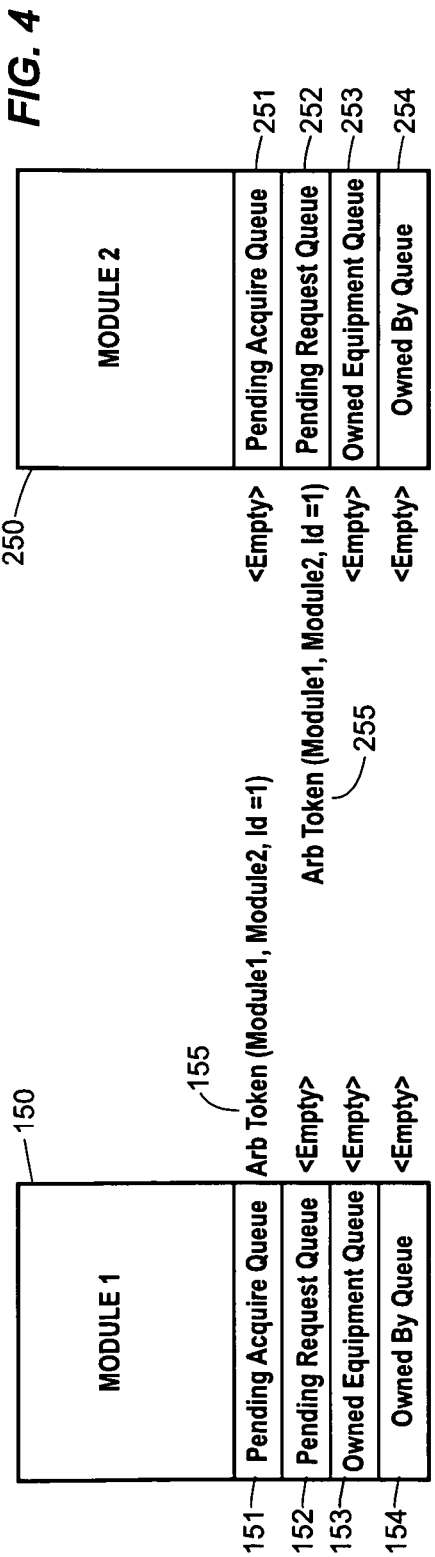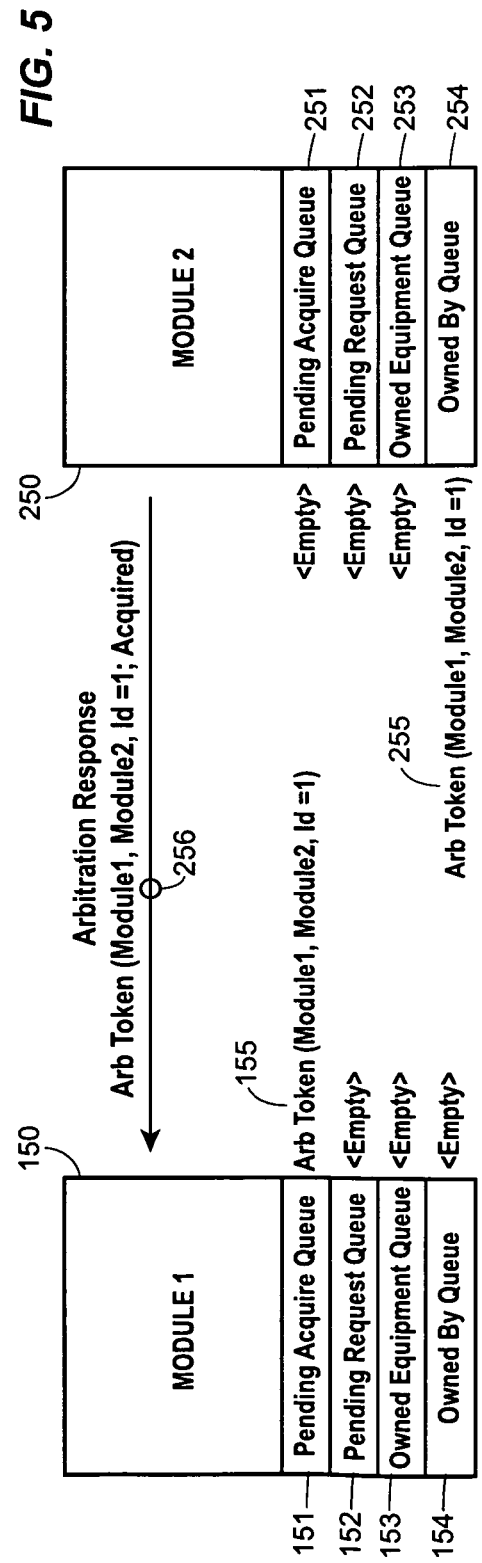

DISTRIBUTED EQUIPMENT ARBITRATION IN A PROCESS CONTROL SYSTEM

FIELD OF DISCLOSURE

The present disclosure relates to equipment ownership arbitration in a process control system. More specifically, a distributed arbitration system is disclosed in which the individual control modules associated with various process control equipment arbitrate ownership issues amongst themselves.

BACKGROUND

Modern processing plants employ elaborate control systems for controlling a vast array of process control field devices and other process related equipment. Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or function blocks being performed in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

In modern process control systems there is often a need for an operator, an application, a control routine or sub-routine or some other process control entity or control logic to acquire exclusive ownership (i.e., control) over some other process control entity in order to perform a particular process related task. Once a process control entity has been acquired by some other process control entity the acquired process control entity may only be controlled by or respond to the acquiring process control entity. Once the particular task is complete, the acquiring process control entity may release the acquired process control entity, whereupon the acquired process control entity may be acquired by a different process control entity, or is at least available to be controlled by or respond to other process control entities.

In a batch processing environment, for example, a batch manager application may be executing a batch process that calls for a number of unit operations to be performed on a particular process unit. A number of process control field devices may be associated with the processing unit for controlling various processing steps associated with the operation of the processing unit. A particular process control device, control module or other logical entity associated with the processing unit may need to acquire exclusive ownership over come or all of the ancillary field devices associated with the processing unit before the batch unit operations can begin on the processing unit. Once the process control device, control module or other logical unit has acquired the various field devices associated with the processing unit, no other process control devices, control modules or other logical entities can effect the operation of the acquired process control field devices. Once the batch unit operations performed on the processing unit are complete, the process control device, control module or other control logic associated with the processing unit may release the various process control field devices which may then be available to be acquired by other process control devices, control modules or other logical entities associated with other processing units or batch operations.

It is not uncommon for conflicts to arise in a process plant when more than one process control device, control module or other logical entity attempts to acquire the same process control device or other process control entity at the same time. Since ownership of one process control device or process control entity by another process control device or process control entity implies exclusive control over the acquired process control device or process control entity, a decision must be made between competing demands to acquire the same process control device or other process control entity.

A process control system may include an equipment ownership arbitration application for resolving such disputes. Typically an ownership arbitration application will be executed at a centralized location such as a user workstation associated with the process control system. For example, a batch manger application for managing batch processes within a process plant may be implemented in a workstation associated with a process control system. The batch manager application may include an arbitration manager. The computer workstation implementing the batch manager application may be connected to one or more process controllers via a local area network or other communication link. Arbitration requests are provided to the arbitration manager when competing demands for ownership over a single process control device, control module or other logical entity arise. When such conflicts arise, the arbitration manager decides which of the competing demands will be honored and which will be rejected or delayed. The arbitration manager makes arbitration decision based on predefined arbitration rules embedded within the arbitration manager application.

A problem with this arrangement is that the arbitration manager executed on a centralized workstation represents a potential single point of failure that could prevent arbitration requests from being processed. If the workstation fails, or the communications over the LAN fail, arbitration requests may go unanswered. Another problem with existing ownership arbitration systems is that the process entities themselves, those that are acquiring other process control entities as well as those that are being acquired, are not made aware of the arbitration decisions that have been made on their behalf. If the centralized arbitration manager is operating properly, it will prevent a process control entity that has been acquired by some other process control entity from being acquired by yet another process control entity. If the centralized arbitration manager is not operating properly, however, or if communications between the arbitration manager and the acquired process control entity are interrupted, the acquired process control entity itself will be incapable of rejecting the acquisition request of the other process control entity and may improperly be owned by more than one other process control entity at the same time. Finally, a control system may implement multiple workstations implementing multiple batch managers. The individual batch managers may each be executing individual arbitration managers. These independent arbitration managers may not be aware of the arbitration decisions made by the other arbitration managers. An arbitration decision made by one arbitration manager may not be respected (or even considered) by another arbitration manager, which can lead to process control entities being inadvertently acquired by more than one other process control entity at the same time, an untenable situation under most process control circumstances.

SUMMARY

The present discloser relates to arbitrating equipment ownership disputes within a process plant environment. Process control entities within a process control system are represented by control modules. For example, a control module may represent an individual process control device, a group of devices, or other process related equipment. Control modules may also be provided to represent logical entities such as applications, control routines, sub-routines, function blocks, and other process control related objects. According to a distributed ownership arbitration system, individual control modules representing various process control entities define a plurality of lists or queues for storing equipment arbitration information. Requests by process control entities to acquire ownership over other process control entities are represented by arbitration tokens. The arbitration tokens represent existing or desired ownership relationships between the acquiring process control entities and the acquired or target process control entities. Copies of the arbitration tokens are communicated between the control modules and are stored in the various arbitration queues defined by the control modules depending on the status of the acquisition requests. Upon receiving an acquisition request from another process control entity, the control module associated with the targeted process control entity decides for itself whether the targeted process control entity is available to be acquired by the requesting control entity based on arbitration rules that are embedded within the control module itself. Once the targeted process control entity has been acquired by another process control entity it may not be acquired by any other process control entity until the acquiring process control entity releases it. The control modules associated with the various process control entities within the process control system keep track of their relationships with other process control entities by placing the arbitration tokens in the appropriate arbitration queues.

An embodiment of a system for arbitrating equipment ownership disputes in a process plant includes a plurality of process control elements, one or more process controllers, and a plurality of control modules executed by the one or more process controllers. A first control module associated with a first one of the plurality of process control elements is adapted to request to acquire ownership over a second one of the plurality of process control elements. A second control module associated with the second one of the plurality of process control elements is adapted to determine whether the second process control element is available to be acquired by the first process control element. The first control element acquires ownership over the second control element only when the second control module associated with the second control element determines that the second control element is available to be acquired by the first control element and submits to the acquisition.

Another embodiment similarly provides a distributed arbitration system in a process control system that includes a plurality of process control devices. The distributed arbitration system includes a plurality of software objects corresponding to the plurality of process control devices. The software objects each define a number ownership arbitration queues for storing arbitration data associated with the corresponding control devices. The arbitration system further includes one or more processors for executing the software objects. When executed by the processor the software objects exchange arbitration data, store arbitration data in the arbitration queues and make arbitration decisions based on arbitration data stored in the arbitration queues.

Still another embodiment provides a method of arbitrating ownership of a first process control entity over a second process control entity. The method includes the first process control entity requesting ownership of the second process control entity. Upon receiving the request the second process control entity determines whether the second process control entity is available to be acquired by the first process control entity. Finally, if the second process control entity determines that the second process control entity is available to be acquired by the first process control entity the second process control entity submits to the acquisition of the second process control entity by the first process control entity.

Finally, in yet another embodiment, a method of implementing a distributed equipment ownership arbitration system is provided. The method is implemented in a process control system that includes a plurality of process control devices and in which one or more of the process control devices must exercise ownership over one or more other process control devices to perform one or more process related tasks. The method comprises implementing a plurality of control modules associated with the process control devices. The control modules define arbitration queues for storing arbitration data relating to the ownership of the process control devices with which the various control modules are associated. The method further calls for generating an arbitration token associated with a request by a first control module to acquire a process control device associated with a second control module. The method further calls for determining whether the process control device with which the second control module is associated is available to be acquired by the process control device with which the first process control module is associated, and if the process control device with which the second process control module is associated is available to be acquired by the process control device with which the first process control module is associated, storing the arbitration token in an arbitration queue defined by the second control module, indicating that the process control device with which the second control module is associated has been acquired by the process control device with which the first control module is associated.

Further aspects and advantages will be apparent to those of ordinary skill in the art from a review of the following detailed description, taken in conjunction with the drawings. While the compositions and methods are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

FIG. 4 is a block diagram of the control modules of FIG. 3 at an intermediate step of processing an arbitration request.

FIG. 5 is a block diagram of the control modules of FIGS. 3 and 4 with the second control module sending an arbitration response to the first control module.

DETAILED DESCRIPTION

The present disclosure relates to a mechanism for arbitrating ownership conflicts between process control entities within a process control system. In many process control situations it may be necessary for a first process control entity to acquire exclusive ownership (i.e. control) or semi-exclusive ownership over some other process control entity in order to carry out a particular process related task. Once the task has been completed the first process control entity may relinquish ownership of the second process control entity so that the second process control entity may be subsequently acquired by other process control entities to perform other tasks within the process plant or to perform the same task in association with other processes or batch operations.

In most cases a particular process control entity may only be owned by one other process control entity at a time. On occasion two or more process control entities may attempt to acquire the same process control entity at the same time, giving rise to an ownership conflict. For example, a first acquiring process control entity associated with a first batch process and a second acquiring process control entity associated with a second batch process may need to acquire a target process control entity in order to perform a phase or step in their respective batch processes. Since only one of the acquiring entities may own the targeted entity at a time, only one of the first and second acquiring process control entities can successfully acquire the target entity. Acquisition of the target entity by the other unsuccessful acquiring entity must be delayed until the first acquiring entity relinquishes ownership of the target entity. Alternatively, the unsuccessful acquiring entity may look elsewhere to acquire a different target entity for carrying out the particular task for which acquisition of the targeted process control entity was required. Such conflicts must be resolved quickly and efficiently with as little interference with the underlying processes as possible to ensure smooth operation of the process plant.

Figure 1:
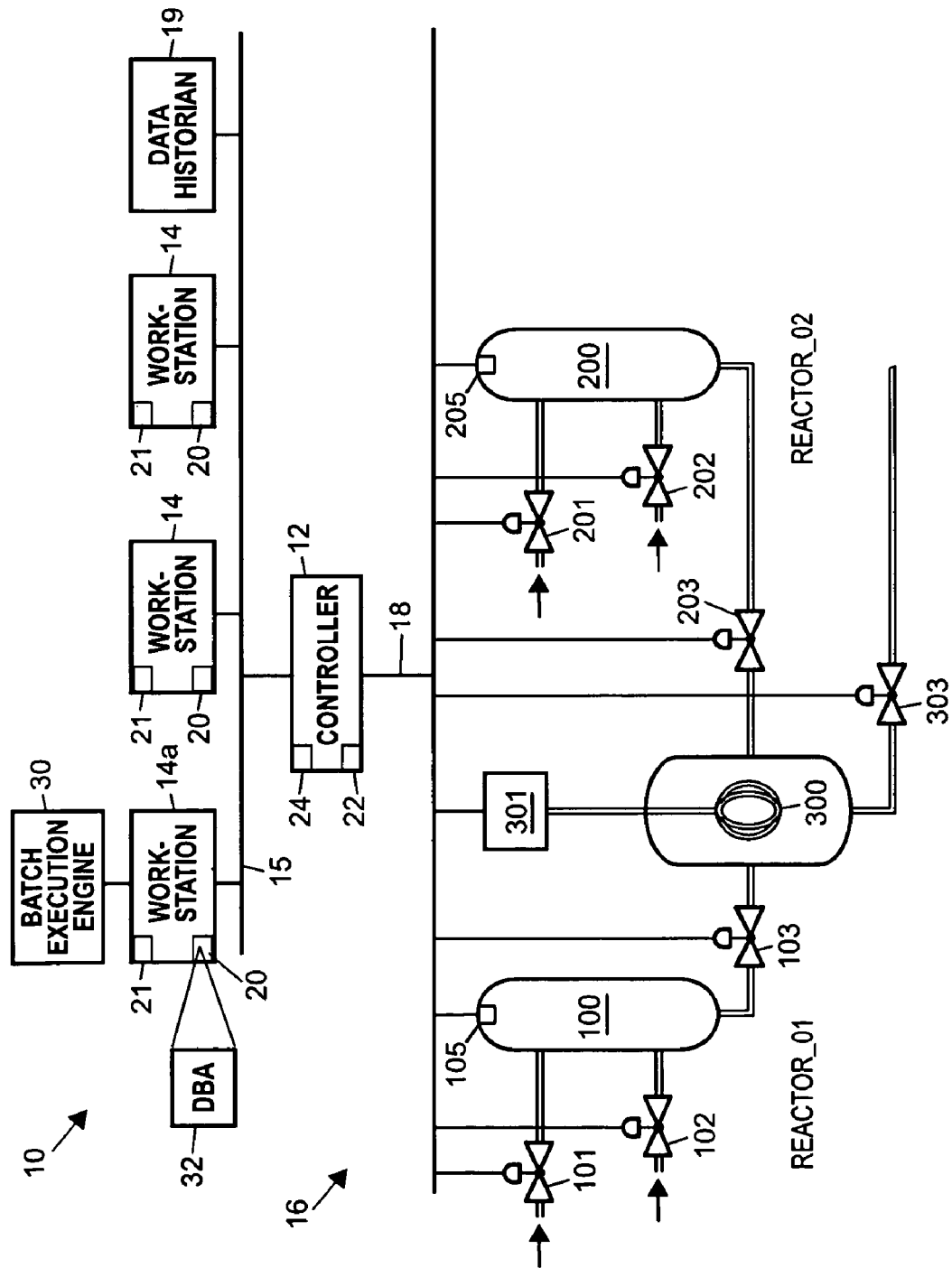
FIG. 1 is a block diagram showing an exemplary portion of a process plant control network.

The equipment ownership arbitration system described herein provides a distributed arbitration process for resolving ownership disputes in which individual control modules associated with various process control entities manage how and when the process control entities with which they are associated may be acquired by other process control entities. FIG. 1 shows an exemplary portion of a typical process plant control network 10 in which such a distributed equipment arbitration system may be employed. The process plant control network 10 includes a controller 12 which is coupled to numerous devices and equipment within a process plant via one or more input/output (I/O) devices (not shown) and a set of communication lines and/or a bus 18. The various devices and equipment connected to the controller 12 are generally designated by reference numeral 16. The controller 12 may be, for example, the DeltaV™ batch controller sold by Emerson Process Management. The controller 12 communicates with various process control elements such as field devices and function blocks within field devices located throughout the process plant to perform one or more process control routines to control various processes performed within the process plant. The process control routines may include both continuous process control routines and batch process control routines.

The process controller 12 may also be coupled to one or more workstations 14 via, for example, a local area network (LAN) 15 such as an ethernet network or the like. The workstations 14 may be personal computers, servers, or other data processing devices. The workstations 14 may be used by processing plant engineers, operators, or other personnel to design and execute one or more programmed control routines to be executed by the controller 12, to communicate with the controller to implement such process control routines, to receive and display information pertaining to the operation of the process plant, and otherwise interact with the process control routines executed by the controller (and/or other process controllers or control devices). A data historian 19 may also be connected to the LAN 15. The data historian 19 may automatically collect data generated within the process plant including within the controller 12, the field devices and other equipment 16, and perhaps the workstations 14 themselves. The workstations 14 may access data stored in the data historian 19 and elsewhere to populate interface display pages with data relating to the operation of the process plant.

Each of the workstations 14 includes a memory 20 for storing applications, such as HMI applications, and for storing data, such as continuous process variable data and batch process data pertaining to the operation of the process plant. Each of the workstations 14 also includes a processor 21 that executes one or more applications which may, among other things, enable a user to view non-batch or continuous process data, as well as batch process data relating to the operation of the process plant. The controller 12 includes a memory 22 for storing configuration data and process control routines to be used to control the equipment 16 within the process plant, and a processor 24 that executes the process control routines to implement a process control strategy. The workstations 14, in conjunction with the controller 12, may provide a graphical depiction of the process control routines within the controller 12 to a user illustrating the control elements within the process control routine and the manner in which these control elements are configured to provide control of the processes performed within the process plant 16.

In the example process plant control network 10 illustrated in FIG. 1, the controller 12 is communicatively connected via the bus 18 to two sets of similarly configured reactor units Reactor_01 and Reactor_02, as well as a mixing unit Mixer_01. Reactor_01 includes a reactor vessel 100, two input valves 101 and 102 connected so as to control fluid inlet lines providing fluid from, for example, a headtank (not shown) into the reactor vessel 100 and an output valve 103 connected so as to control fluid flow out of the reactor vessel 100 via an outlet fluid line. A device 105, which can be a sensor, such as a temperature sensor, a pressure sensor, a fluid level meter, or some other equipment such as an electrical heater or a steam heater, is disposed in or near the reactor vessel 100. Reactor_01 is coupled via the valve 103 to Mixer_01. Similarly, Reactor_02 includes a reactor vessel 200, two input valves 201 and 202, an output valve 203 and a device 205. The Reactor_02 is coupled to Mixer_01 via the output valve 203. Mixer_01 includes a mixing vessel 300, and agitator 301, and an outlet valve 303.

As illustrated in FIG. 1, the controller 12 is communicatively coupled to the valves 101-103, 201-203, 303, to the devices 105, 205, and to the agitator 301, via the bus 18 to control the operation of these elements (which may be units, field devices, etc.) to perform one or more operations with respect to these elements. Such operations may include, for example, filling the reactor vessels, heating the material within the reactor vessels, filling the mixing vessel 300 from one or both of the reactor vessels 100, 200, cleaning the reactor vessels 100, 200 or the mixing vessel 300, etc. Of course, the controller 12 could be coupled to the elements 16 within the process plant via additional busses, via dedicated communication lines, such as 4-20 mA lines, HART communication lines, etc.

The valves, sensors and other equipment illustrated in FIG. 1 may be any desired kind or type of equipment including, for example, Fieldbus field devices, standard 4-20 mA field devices, HART field devices, etc., and may communicate with the controller 12 using any known or desired communication protocol such as the Fieldbus protocol, the HART protocol, the 4-20 mA analog protocol, etc. Still further, other types of devices may be connected to and be controlled by the controller 12 in any desired manner. Also, other controllers may be connected to the controller 12 and to the workstations 14 via, for example, the Ethernet communication line 15 to control other devices or areas associated with the process plant 16 and the operation of such additional controllers may be coordinated with the operation of the controller 12 illustrated in FIG. 1 in any desired or known manner.

Generally speaking, the process control system of FIG. 1 may be used to implement batch processes in which, for example, one or more of the workstations 14 executes a batch execution engine that implements and coordinates different batch runs within the process plant. Such a batch execution engine 30 is illustrated as being stored in the workstation 14*a* of FIG. 1, it being understood that the batch execution engine 30 could be stored in and executed in other workstations 14, or that additional batch execution engines could be executed in other workstations, or that one or more batch execution engines could be stored and executed in other computers communicatively connected to the bus 15 or to the bus 18 in any desired manner, including in any wireless manner. Likewise, if desired, the batch execution engine 30 may be divided into various components or be associated with various components stored in and executed in different computers or workstations within the process plant.

The batch execution engine 30 is generally a high level control routine and may include what is commonly referred to as a batch campaign manager that enables a user to specify a number of batch runs to be performed within the process plant and that sets up a number of different batch runs or batch processes to operate essentially independently within the process plant control network 10. The batch execution engine 30 may also include batch executive routines or applications that implement and oversee the different batch runs specified by the campaign manager. Each such batch run directs the operation of one or more procedures, unit procedures, operations, phases and other sub-divisions of a batch. For this discussion, a phase is the lowest level action or step performed on a unit and is typically implemented or executed in one of the controllers 12. An operation is a set of phases that performs a particular function on the unit and is typically implemented or executed on one of the workstations 14 by calling a series of phases within the controller 12. A unit procedure is a series of one or more operations performed on a single unit and is typically implemented as a set of operation calls on one of the workstations 14. Likewise, a procedure is a set of unit procedures which may be performed on, for example, different physical units within the process plant 16. As a result, any procedure can include one or more unit procedures, any unit procedure can include one or more operations, and any operation may include one or more phases. In this manner, each batch process performs different steps or stages (e.g., unit procedures) needed to produce a product, such as a food product, a drug, etc.

To implement different procedures, unit procedures, operations and phases for an individual batch, a batch process uses what is commonly referred to as a recipe which specifies the steps to be performed, the amounts and times associated with the steps and the order of the steps. Steps for one recipe might include, for example, filling a reactor vessel with the appropriate materials or ingredients, heating the materials within the reactor vessel to a certain temperature for a certain amount of time, emptying the reactor vessel and then cleaning the reactor vessel to prepare for the next batch, mixing materials in a mixing vessel, and so forth. Each of the series of steps associated with a different unit defines a unit procedure of the batch and the batch process will execute a different control algorithm for each one of these unit procedures. Of course, the specific materials, amounts of materials, heating temperatures and times, etc. may be different for different recipes and, consequently, these parameters may change from batch run to batch run depending on the product being manufactured or produced and the recipe being used.

Equipment conflicts may arise when multiple batch processes are being performed in a process plant at the same time. First and second batch processes implemented at approximately the same time may include phases that are to be carried out on the same equipment at the same time. In FIG. 1, for example, the contents of the reactor vessel 100 in Reactor_01 may be associated with a first batch process and the contents of the reactor vessel 200 in Reactor_02 may be associated with a second batch process. The first batch process may call for the contents of the reactor vessel 100 of Reactor_01 to be discharged into the mixing vessel 300 of Mixer_01 and mixed for some period of time. Similarly, the second batch process may call for the contents of the reactor vessel 200 of Reactor_02 to be discharged into the mixing vessel 300 of Mixer_01 and mixed for some other period of time. The first and second batches correspond to separate processes. It may not be desirable to mix the contents of the reactor vessel 100 of Reactor_01 with the contents of the reactor vessel 200 of Reactor_02. Thus, before Reactor_01 discharges the contents of the reactor vessel 100 into the mixing vessel 300 of Mixer_01, Reactor_01 must "own," i.e. posses exclusive control over, Mixer_01 to ensure that Reactor_02 or any other reactor unit does not attempt to introduce unwanted materials into the mixing vessel 300 while the mixing phase of the first batch process is underway. Similarly, Reactor_02 must possess Mixer_01 before it can discharge the contents of reactor vessel 200 into the mixing vessel 300. Preferably, Reactor_02 cannot interact with Mixer_01 at all while Mixer_01 is owned by Reactor_01, and Reactor_01 cannot interact with Mixer_01 while Mixer_01 is owned by Reactor_02. A conflict arises when the batch process being run of Reactor_01 calls for Reactor_01 to acquire ownership of Mixer_01 at the same time the batch process being run on Reactor_02 calls for Reactor_02 to acquire ownership of Mixer_01.

When such equipment conflicts arise, an ownership arbitration system determines which acquiring entity will be granted exclusive ownership of the targeted entity, and which acquiring entity's request will be delayed or denied. According to an embodiment of a distributed ownership arbitration system, control modules associated with the various process control entities in a process control system determine whether or not the process control entities with which they are associated may be acquired by other process control entities. Once a control module associated with a targeted process control entity submits to the acquisition of the targeted entity by an acquiring entity, the targeted entity "belongs to" or is "owned" by the acquiring entity until it is released by the acquiring entity. Other process control entities may not acquire the targeted entity once it has been acquired by another process control entity. According to an embodiment of a distributed ownership arbitration system, process control entities may acquire multiple other process control entities, but, except for the limited situations described below, a particular process control entity may only be owned by one other process control entity at a time. Further, process control entities that own other process control entities may themselves be acquired or owned by the other process control entities. For purposes of this description, process control entities may comprise physical process control devices, processing units, and any other process related equipment, or logical units such as control modules, function blocks, and the like.

According to a distributed ownership arbitration system, control modules are associated with various process control entities. For example, with reference to FIG. 1, individual control modules may be associated with Reactor_01 and the various components comprising Reactor_01, including the reactor vessel 100, the inlet valves 101, 102, the outlet valve 103, and the device 105. Similarly, individual control modules may be associated with Reactor_02 and the various components comprising Reactor_02, including reactor vessel 200, the inlet valves 201, 202, the outlet valve 203, and the device 205. Finally, individual control modules may also be associated with Mixer_01 and the various components comprising Mixer_01, including the mixing vessel 300, the agitator 301, and the outlet valve 303.

Figure 2:
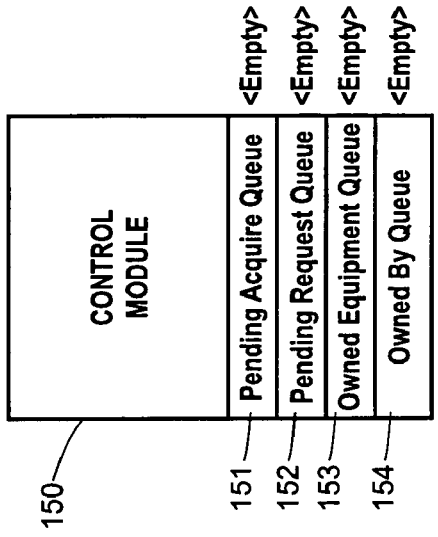
FIG. 2 is a block diagram of a control module including arbitration queues for implementing a distributed equipment ownership arbitration system.
Figure 3:
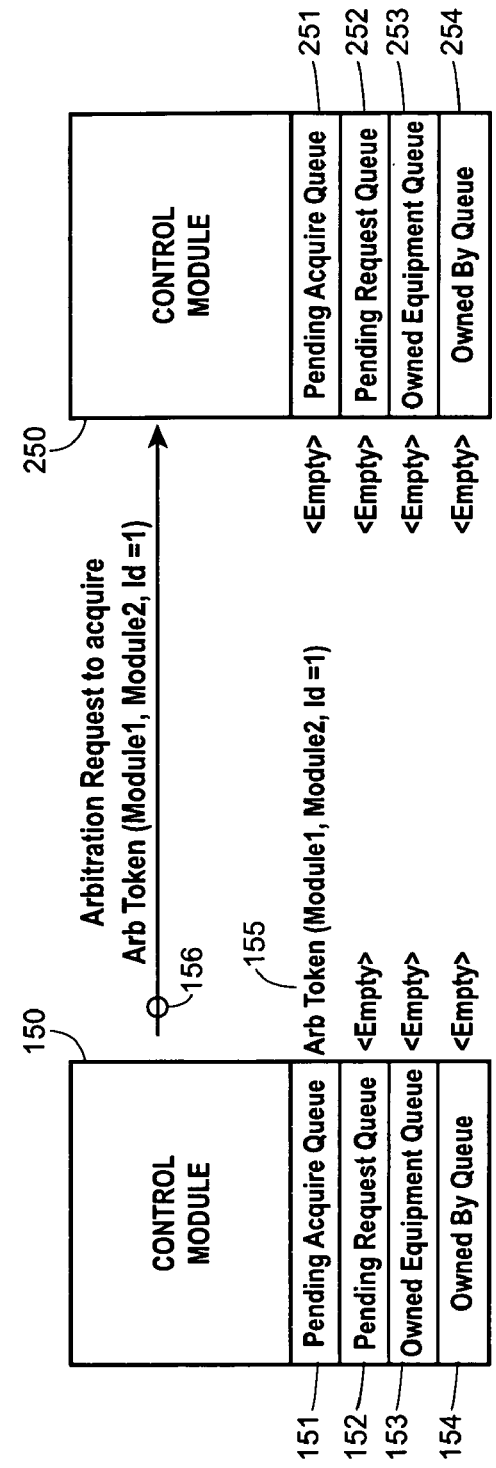
FIG. 3 is a block diagram showing a pair of control modules with a first control module initiating an arbitration request.

The control modules associated with the various process control entities each define a plurality of arbitration queues for managing the acquisition and ownership of the various process control entities by other process control process control entities. FIG. 2 shows an exemplary process control module 150 with its corresponding arbitration queues. The process control module 150 defines a Pending Acquisitions Queue 151, a Pending Requests Queue 152, an Owned Equipment Queue 153, and an Owned-By Queue 154. The Pending Acquisitions Queue 151 stores information relating to requests by the process control module 150 to acquire other process control entities, while the Pending Requests Queue 152 stores information relating to requests from other process control modules to acquire the process control entity with which the process control module 150 is associated. The Owned Equipment Queue 153 stores information relating to process control entities owned by the process control entity with which the process control module 150 is associated, and the Owned-By Queue 154 stores information relating to one or more other process control entities that own the process control entity with which the process control module 150 is associated.

The operation of a distributed ownership arbitration system is illustrated in FIGS. 3-8. FIGS. 3-8 show the first control module 150 of FIG. 2 and a second process control module 250. The first control module 150 is associated with a first process control entity within a process plant and the second control module 250 is associated with a second process control entity within a process plant. For example, the first control module 150 may be associated with the reactor vessel 100 of Reactor_01 (FIG. 1), and the second control module 250 may be associated with the outlet valve 103 for draining the reactor vessel 100 of Reactor_01. As described with reference to FIG. 2, the first control module 150 includes a Pending Acquisition Queue 251; a Pending Requests Queue 152, an Owned Equipment Queue 153, and an Owned-By Queue 154. The second control module 250 also includes a Pending Acquisitions Queue 251; a Pending Requests Queue 262; an Owned Equipment Queue 253; and an Owned-By Queue 254.

The first and second control modules 150, 250 arbitrate ownership disputes as follows. Assume that the first and second control module 150, 250 are part of a process control system that is executing a batch process phase that requires a first process control entity with which the first control module 150 is associated to acquire a second process control entity with which the second control module 150 is associated. For example, the control system may be executing a batch phase on Reactor_01 that calls for filling the reactor vessel 100. In order to fill the reactor vessel 100, the outlet valve 103 must be closed and one or both of the inlet valves 102, 102 must be opened. Thus, during this phase, the reactor vessel 100 must acquire ownership over the outlet valve 103 and the inlet valves 101, 102 to ensure that no other process control entity interferes with the filling of the vessel 100 by opening or closing the valves 101, 102, 103 at an improper time. In this example, the first control module 150 may be associated with the reactor vessel 100 and the reactor vessel 100 corresponds to the first process control entity, the second control module 250 may be associated with the outlet valve 103 and the outlet valve 103 corresponds to the second process control entity. Although, it should be noted that the distributed ownership arbitration system operates in the same manner regardless of the particular process control entities with which the various control modules are associated.

When the fill reactor vessel phase is executed, the first control module 150 associated with the reactor vessel 100 is responsible for acquiring ownership of the outlet valve 103, and the second control module 250 associated with the outlet valve 103 is responsible for determining whether the outlet valve 103 is available to be acquired by the reactor vessel 100 (or any other process control entity) and submitting to such acquisition if it determines that the outlet valve 103 is in fact available to be acquired by the vessel 100. The batch phase calling for filling the rector vessel 100 cannot move forward unless and until the first process control entity (the reactor vessel 100) acquires the second process control entity (the outlet valve 103).

Once the first process control entity has acquired the second process control entity, the first process control entity retains exclusive ownership of the second process control entity until the first process control entity affirmatively releases the second process control entity. Furthermore, once the second process control entity has been acquired by the first process control entity, the second process control entity may not be acquired by any other process control entity until it has been released by the first process control entity.

Initially the various arbitration queues of the first and second control modules 150, 250 are empty. Neither of the first and second process control entities with which the first and second control modules 150, 250 are associated have acquired or been acquired by any other process control entities, nor have any other process control entities attempted to acquire either of the process control entities with which the control modules 150, 250 are associated, nor have the control modules 150, 250 attempted to acquire any other process control entities.

In order for the first process control entity to acquire the second process control entity, the first control module 150 generates an ownership arbitration token. The arbitration token is a set of data that may be communicated between control modules and which represents a relationship between the process control entities. The arbitration token may identify, for example, a source (i.e., the control module or process control entity requesting or asserting ownership over another process control entity), a destination (i.e., the process control entity or control module over which the source is requesting or asserting ownership), and an arbitration token I.D. so that the arbitration token may be quickly identified and tracked by the control modules associated with the various process control entities. If desired, the arbitration token may be adapted to include additional data such as a priority value, or other data not specifically related to arbitrating ownership disputes. For example, data relating to material tracking may be included in an arbitration token and passed between control modules along with the arbitration token to facilitate the creation of a batch history that may be used to trace the various processing steps performed to produce a batch product and to identify the equipment on which the various processing steps were performed.

The first control module 150 stores a copy of the arbitration token in its own Pending Acquisition Queue 151 and sends an arbitration request message 156 to the second control module 250. The arbitration request message includes a copy of the arbitration token. As mentioned, the arbitration token identifies the source of the request and the destination or target of the request. Thus, upon receiving the arbitration request, the second control module 250 learns that the first process control entity with which the first control module 150 is associated is seeking to acquire ownership over the second process control entity with which the second process control module 250 is associated.

As shown in FIG. 4, upon receiving the arbitration request message from the first control module 150, the second control module 250 stores a copy of the arbitration token in its Pending Requests Queue 252. The copy of the arbitration token will remain in the Pending Requests Queue 254 until the first process control entity successfully acquires the second process control entity, or until the arbitration token expires (if it was created having a limited duration), or until the first control module sends a request to withdraw the acquisition request before the acquisition of the second process control module is complete. In any case, upon receiving the acquisition request and storing the copy of the arbitration token in the Pending Requests Queue 252, the second control module 250 evaluates the state of its own arbitration queues to determine whether the second process control entity may be acquired by the first process control entity. Specifically, the second control module 250 evaluates its Owned-By-Queue 254 to determine whether the second process control entity has already been acquired by any other process control entity. If another arbitration token is already stored in the Owned-By-Queue 254, the second process control entity has already been acquired by another process control entity and is not currently available to be acquired by the first process control entity. If the second control module's Owned-By-Queue 254 is empty, however, then the second process control entity is available to be acquired by another process control entity.

It remains to be determined, however, whether the first process control entity is first in line to acquire the second process control entity or whether some other process control entity has a superior claim to ownership of the second process control entity. To resolve this question the second control module evaluates the Pending Requests Queue 254. According to an embodiment of a distributed ownership arbitration system, the Pending Requests Queues of the various control modules operate on a first-in first-out basis. As arbitration request messages are received from other control modules, the control module receiving the requests stores the associated arbitration tokens in the Pending Requests Queue in the order in which they are received. When the process control entity with which the control module is associated becomes available to be acquired by another process control entity, the control module selects the arbitration token at the head of the queue. In other words, the control module associated with the target process control entity selects the arbitration token that has been stored in the Pending Requests Queue the longest. The control module associated with the targeted process control entity then moves the arbitration token from the Pending Requests Queue to the Owned-By-Queue. Thus, the process control entity having the longest standing request to acquire the targeted process control entity is the process control device that acquires the targeted process control entity when the targeted process control entity next becomes available. The result is that according to this embodiment of a distributed ownership arbitration system, ownership conflicts are resolved on a first-come first-serve basis.

In an alternative embodiment the arbitration tokens may include a priority value. For example, an arbitration token may include a priority value that indicates that the corresponding request to acquire the targeted process control entity is a high, medium, or low priority request. According to this embodiment, when the control module associated with the targeted process control entity evaluates its Pending Requests Queue, it may first select the arbitration token having the highest priority value. If there are multiple arbitration tokens stored in the pending request queue having the same priority value the control module associated with the targeted process control entity may select the arbitration token that has the highest priority value and which has been stored in the Pending Requests Queue the longest. Thus, according to this alternative embodiment, the highest priority requests are handled first on a first-come first-serve basis, but all higher priority requests are addressed before lower priority requests, regardless of when the lower priority requests were received.

Returning to the example illustrated in FIGS. 3-8, the arbitration token 255 associated with the request by the first process control entity to acquire the second process control entity is the only arbitration token stored in the Pending Requests Queue 252 of the second control module 250. Thus, the arbitration token 255 is at the head of the Pending Requests Queue 252. This means that there are no higher priority ownership requests pending from other control modules. Therefore, since the second process control entity is available to be acquired and since the first process control entity has the highest priority request pending, the second control module 250 determines that the second process control entity is available to be acquired by the first process control entity, and submits to the acquisition. The second control module moves the copy of the arbitration token 255 from the Pending Requests Queue 252 to the Owned-By Queue 254 as shown in FIG. 5. The second control module 250 also prepares and sends an arbitration response message 256 to the first control module 150. The arbitration response message 256 includes a copy of the original arbitration token with an "acquired" status indicating that the first process control entity has successfully acquired the second process control entity.

Figure 6:
FIG. 6 is a block diagram of the control modules of FIGS. 3-5 showing the completed acquisition of a process control entity with which the second control module is associated by a process control entity with which the first control module is associated.

Upon receiving the arbitration response message 256 from the second control module 250, the first control module 150 moves its copy of the arbitration token 155 from its Pending Acquisitions Queue 151 to its Owned Equipment Queue 154, as shown in FIG. 6. This indicates that the acquisition of the second process control entity by the first process control entity is complete and that the first process control entity owns the second process control entity. The batch phase that required the first process control entity to acquire the second process control entity may now proceed.

Figure 7:
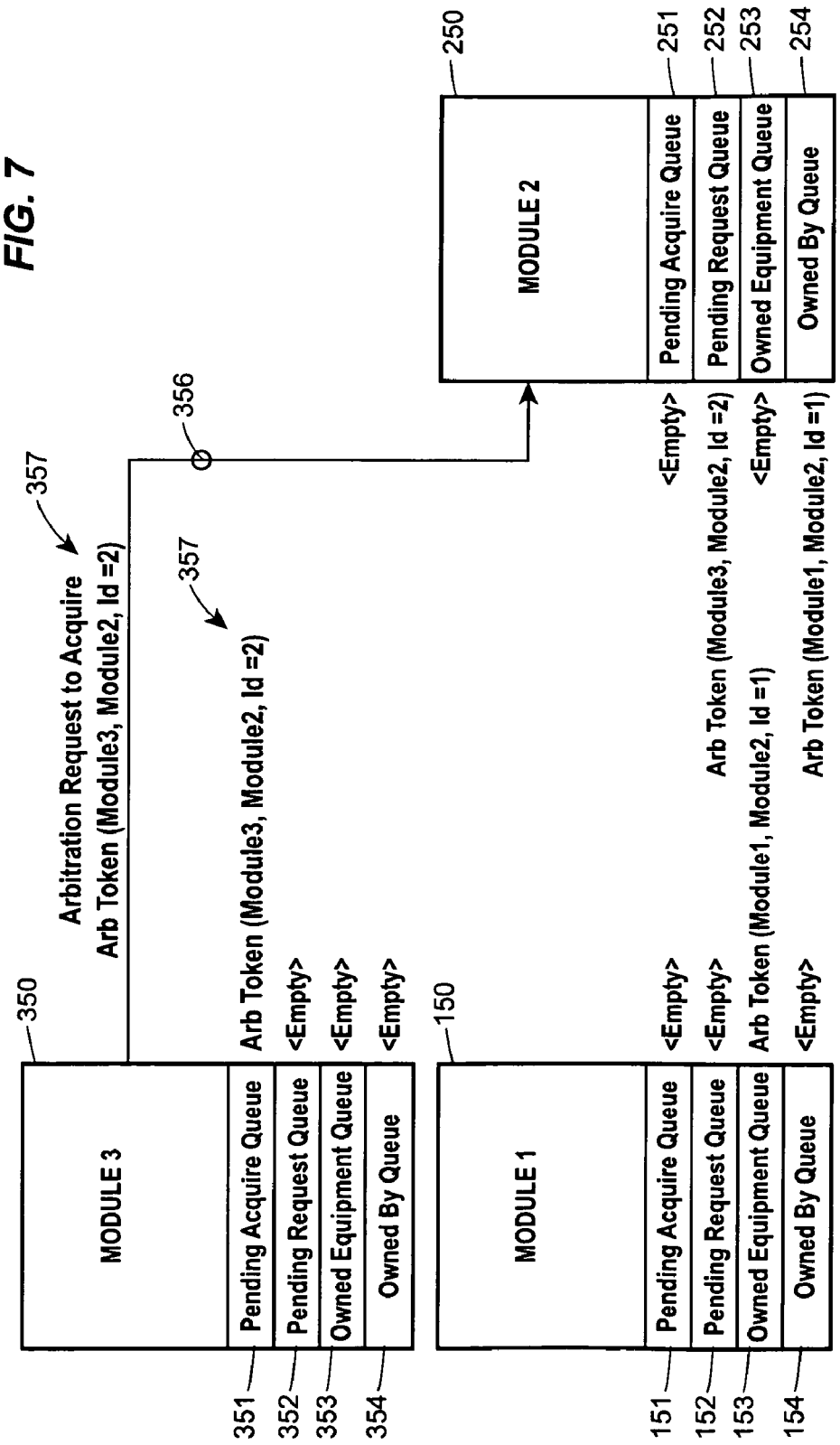
FIG. 7 is a block diagram showing the two control modules of FIGS. 3-6 along with a third control module, the third control module initiating an arbitration request to acquire the process control entity with which the second control module is associated at a time when the process control entity with which the second control module is associated is owned by the process control entity with which the first control module is associated.

Once the first process control entity has acquired ownership of the second process control entity, the first process control entity maintains ownership of the second process control entity until the first control module 150 affirmatively releases the second process control entity. In the meantime, no other process control entities can acquire ownership of the second process control entity. FIG. 7 shows a third process control module 350 sending an arbitration request message 356 to the second control module 250 while the second process control entity is associated is still owned by the first process control entity. As with the first arbitration request message 155 from the first control module 150, the arbitration request message 356 from the third control module 350 includes a copy of an arbitration token 357. The second control module 250 stores the arbitration token 357 in its Pending Requests Queue 252. Again, the second control module 250 reviews the status of its Owned-By Queue 254 to determine whether the second process control entity is available to be acquired. In this case the second control module 250 determines that the second process control entity is currently owned by the first process control entity. Since the second process control entity is already owned by another process control entity it cannot be acquired by the third process control entity or any other process control entity. The copy of the arbitration token 357 received from the third control module 350 remains stored in the second control module's Pending Requests Queue 252 until the second process control entity is released by the first process control entity and is again available to be acquired by other process control entities.

Figure 8:
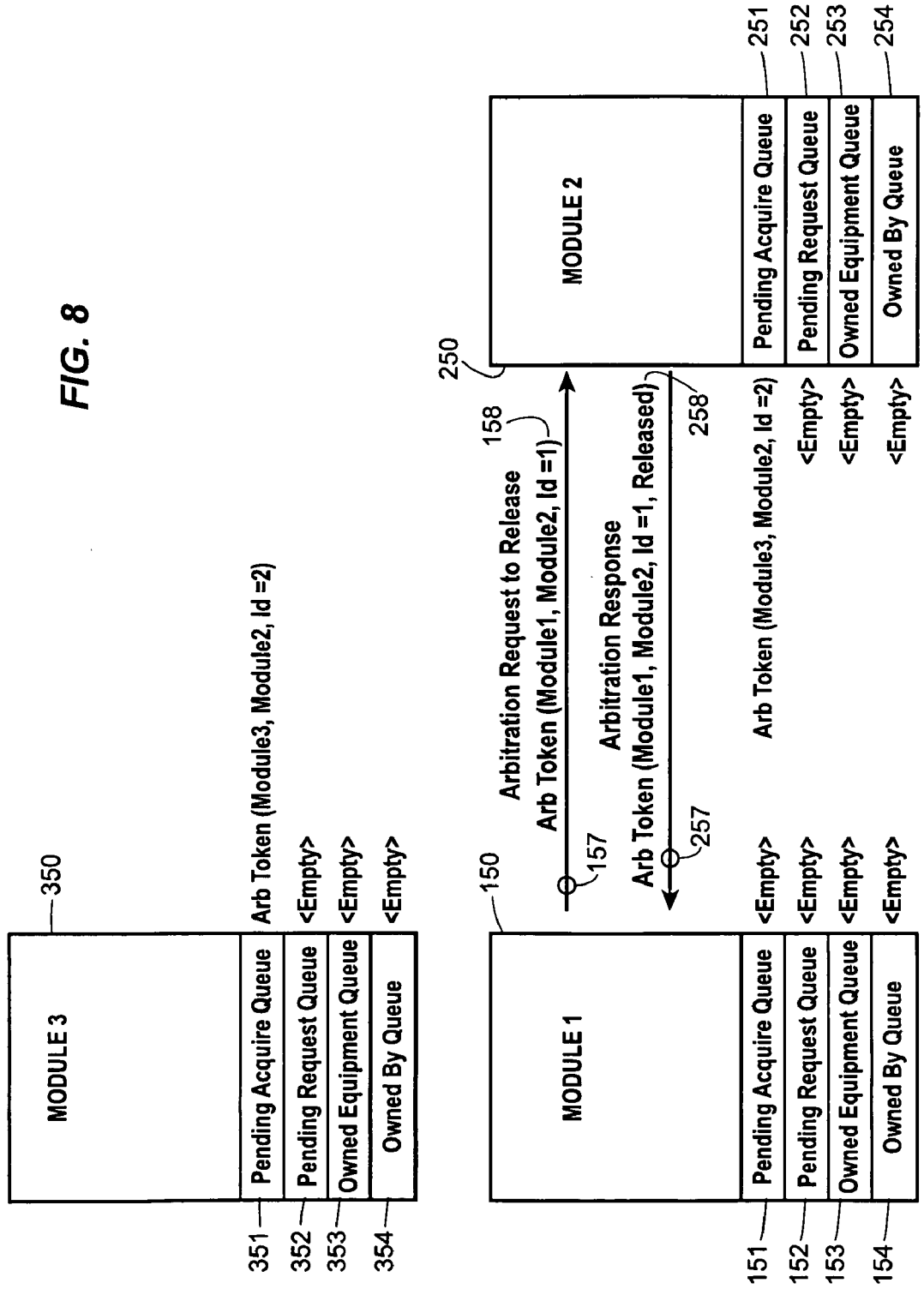
FIG. 8 is a block diagram showing the three control modules of FIG. 7, with the first and second control modules in the process of releasing the process control entity with which the second control module is associated from being owned by the process control entity with which the first control module is associated.

The first process control entity may release the second process control entity when the batch phase that required the first process control entity to acquire the second process control entity is complete. The first control module 150 sends an arbitration release message 157 to the second control module 250 to release the second process control entity, as shown in FIG. 8. Again, the arbitration release message includes a copy of the original arbitration token 158. Upon receiving the arbitration release request message 157, the second control module 250 compares the arbitration token 158 included in the arbitration release message 157 with the arbitration token stored in the second control module's Owned-By-Queue 254 to verify that the release request was sent by the control module associated with the process control entity that currently owns the second process control entity. Once the second control module ensures that the release request is valid, the second control module deletes the copy of the arbitration token 255 from its Owned-By Queue 254. The second control module then sends an arbitration response message 257 back to the first control module 150. The arbitration response message 257 includes a copy of the arbitration token 258 with a "released" status indicating that the second process control entity has been released and is no longer owned by the first process control entity. The first control module 150 receives the arbitration response message 257 and verifies that the arbitration token 258 in the arbitration response message matches the arbitration token stored in the first control module's Owned Equipment Queue 153 and deletes the copy of the arbitration token 155 from the Owned Equipment Queue 153.

Figure 9:
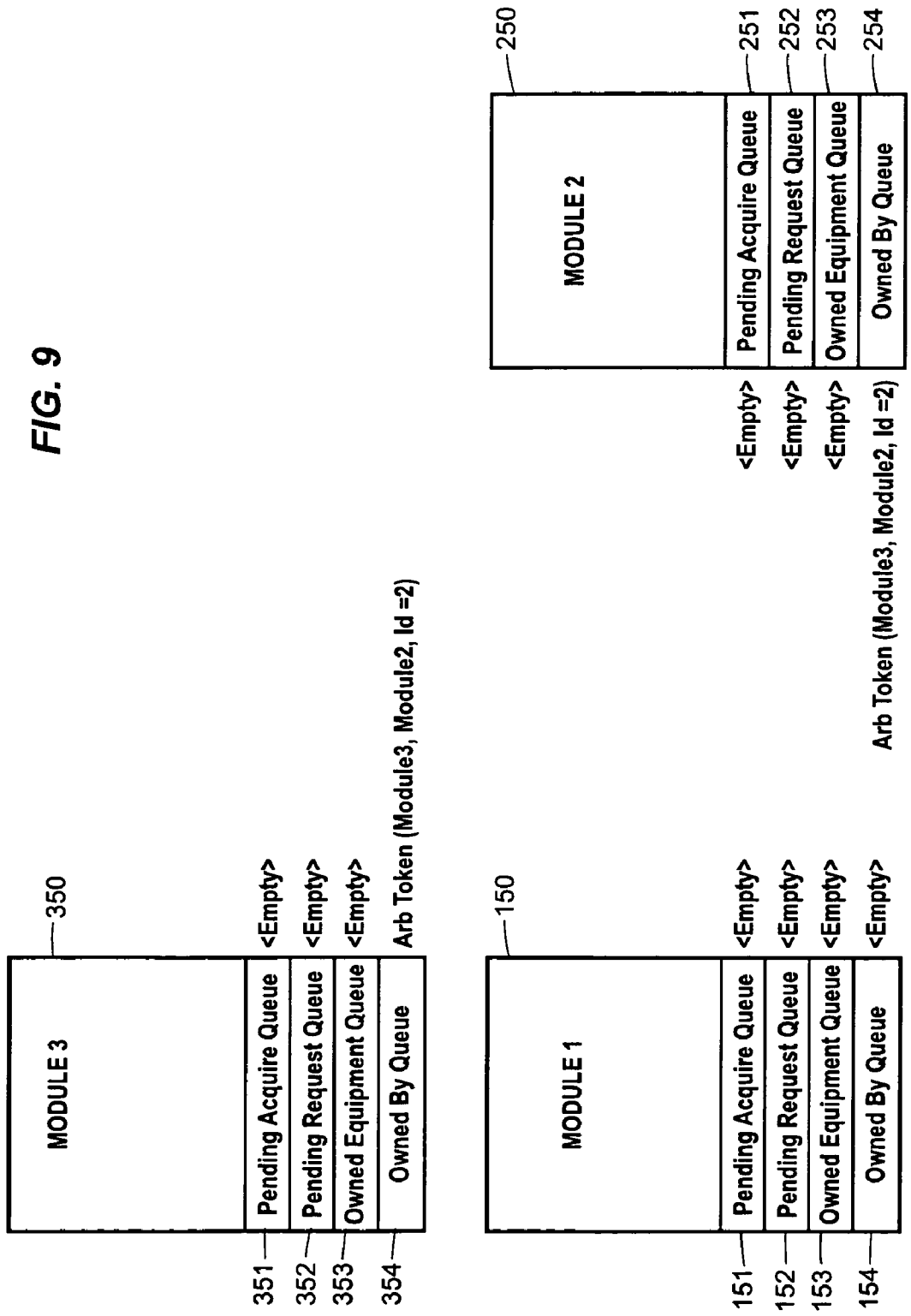
FIG. 9 is a block diagram showing the three control modules of FIGS. 7 and 8, when the acquisition of the process control entity with which the second control module is associated by the process control entity with which the third control module is associated is complete.

At this point the first process control entity no longer owns the second process control entity. The second process control entity may now be acquired by other process control entities, including the third process control entity. Since the arbitration token 355 received from the third control module 350 is now at the head of the second control module's Pending Requests Queue 252, and since the second process control entity is now available to be acquired, the third process control entity may now acquire the second process control entity. The second control module moves the arbitration token 355 from the pending acquisitions queue 252 into the Owned-By Queue 254, and sends an arbitration response to the third control module 350 with an "acquired" status indicating that the third process control entity has now acquired ownership of the second process control entity. Upon receiving the arbitration response message the third control module 350 moves a copy of the arbitration token 355 from its Pending Acquisitions Queue 371 to its Owned Equipment Queue 373 as shown in FIG. 9, and the third process control entity's acquisition of the second process control entity is complete.

According to the distributed ownership arbitration system disclosed herein, the control modules associated with the various process control entities manage the relationships between the process control entities. The control modules determine when the process control entities with which they are associated may be acquired by other process control entities, and determine which other process control entities may acquire the process control entities with which they are associated based on rules embedded within the control modules themselves. For example, a control module may be configured to respond to acquisition requests on first-in first-out basis, or based on priority values embedded within the arbitration tokens provided with pending requests. Additional rules and limitations for the acquisition of process control entities may be programmed into the control modules associated with various process control entities. For example, a particular process control entity sought to be acquired by another process control entity may not allow itself to be acquired until it has itself acquired one or more other process control entities. For example, consider Reactor_01 and Mixer_01 in FIG. 1. In order to discharge the contents of the reactor vessel 100 into the mixing vessel 300, the reactor vessel 100 may be required to acquire ownership of the mixing vessel 300. In order to receive material from reactor vessel 100, however, the mixing vessel 300 must in turn have exclusive ownership over the outlet valve 303 to ensure that the material from the reactor vessel 100 is not inadvertently drained from the mixing vessel prematurely. Therefore, the control module associated with the mixing vessel 300 may be configured to refuse acquisition of the mixing vessel 300 by the reactor vessel 100 until the mixing vessel has successfully acquired ownership of the outlet valve 303. In other words, the reactor vessel may be prevented from acquiring the mixing vessel 300 until the mixing vessel 300 has acquired ownership over all of the other components it needs to properly perform its own tasks related to the batch process.

In another embodiment, an acquiring control module associated with a first process control entity may be adapted to send a conditional acquisition request to the control modules associated with a second process control entities which the first process control entity, seeks to acquire. In this case the first process control entity will acquire the second process control entity immediately if the second process control module determines that the second process control entity is available. If the second process control entity is not available to be acquired, an acquisition failure response message is be returned to the acquiring process control module associated with the first process control entity. In this case, the acquisition token is never placed in the pending requests queue of the second process control module associated with the second process control entity that the first process control entity is attempting to acquire. Instead, the acquiring control module associated with the first process control entity may immediately attempt to acquire a substitute process control entity by sending a conditional acquisition request to a control module associated with another process control entity that performs the same or a similar function. In this way the acquiring control module may quickly poll a number of different resources until it locates a resource that is immediately available. After polling all possible resources for performing a particular task, the acquiring control module may send an unconditional acquisition request to one or more control modules associated with process control entities which the first process control entity needs to acquire in order to be placed in the pending requests queues of the one or other control modules if none of the resources are immediately available.

As mentioned earlier, in most cases a particular process control entity may be owned by only one other process control entity at a given time. There are cases, however, in which it may be desirable for a process control entity to be owned by more than one other process control entity. A head tank, for example, that supplies water or some other process fluid to multiple units may be of sufficient size to supply several units simultaneously. A head tank large enough to supply both of the reactor vessels 100, 200 in Reactor_01 and Reactor_02 of FIG. 1 may not be large enough to supply a third reactor unit. In this case it may be desirable to allow the head tank to be acquired by two process control entities at one time, but not by a third. The distributed ownership arbitration system described above may be readily adapted to allow a process control entity to be acquired by multiple other process control entities by simply expanding the size of the Owned-By Queue in the control module associated with the process control entity. In the example of a head tank that has the capacity to supply two reactor vessels simultaneously but not a third, the Owned-By Queue of the control module associated with the head tank may be adapted to hold two arbitration tokens. A process control entity such as Reactor_01 or Reactor_02 may acquire semi-exclusive ownership of the head tank so long as less than two arbitration tokens are stored in the Owned-By Queue of the control module associated with the head tank. A third process control entity, however, would be denied ownership of the head tank if the head tank had already been acquired by two other process control entities. A control module's Owned-By Queue could be expanded to hold any number of arbitration tokens. In this way, a targeted process control entity may be configured to be acquired or owned by any pre-defined number of other process control entities at the same time.

Another advantage of the distributed arbitration system described above is that process control entities may be reserved in advance before they are actually needed to perform a particular batch phase or other process related task. For example, assume that a batch unit operation is being performed on Reactor_02 in FIG. 1. Suppose the batch unit operation takes one hour to complete, and that at the end of the batch unit operation the contents of the reactor vessel 200 must be transferred to the mixing vessel 300 of Mixer_01. The reactor vessel 200 must acquire ownership of the mixing vessel 300 before it can discharge the contents of the reactor vessel 200 into the mixing vessel 300. The reactor vessel 200 does not need to acquire the mixing vessel 300, however, until one hour after the batch unit operation executed on Reactor_02 is started. An external application, such as a batch manager, a batch campaign manager, or some other application, may send an acquisition request message to the control module associated with the mixing vessel 300 in advance of the time when the reactor vessel 200 must actually acquire the mixing vessel. This acquisition request message may include a dummy arbitration token which the control module associated with the mixing vessel 300 stores in its Pending Requests Queue. The dummy arbitration token does not include sufficient data for the reactor vessel 100 to actually acquire the mixing vessel 300, but acts as a placeholder within the Pending Requests Queue of the control module associated with the mixing vessel 200. Thus, at the time when the reactor vessel 200 must actually acquire the mixing vessel 300, the dummy arbitration token or placeholder will have advanced in the Pending Requests Queue so that the mixing vessel 300 will in fact be available to be acquired by the reactor vessel at the appropriate time. In this way, the batch process will be able to move on to unit operations on the mixing unit without delay while the reactor vessel 200 attempts to acquire ownership over the mixing vessel 200.

A distributed ownership arbitration system as described herein provides for the smooth operation of a processing plant. The process control entities within the process plant manage ownership issues amongst themselves according to predefined rules, yet the rules are sufficiently flexible to ensure that the process control resources of the process plant are employed effectively and wisely.

While the present disclosure has been described with reference to specific examples, which are intended to be illustrative only and not to be limiting, it will be apparent to those of ordinary skill in the art that changes, additions or deletions may be made to the disclosed embodiments without departing from the spirit and scope of the invention.

The invention claimed is:

1. A system for arbitrating equipment ownership disputes in a process plant, the system comprising:
a plurality of process control entities;
one or more process controllers;
a plurality of control modules executed by the one or more process controllers;
a first control module associated with a first process control entity and a second control module associated with a second process control entity, the first and second control modules each defining a plurality of ownership arbitration queues, including; a pending acquisitions queue; a pending requests queue; an owned equipment queue; and an owned by queue, the first control module adapted to request to acquire ownership of the second process control entity by sending an arbitration token requesting ownership of the second process control to the second control module and storing a copy of the arbitration token in the pending acquisitions queue of the first control module; and
the second control module adapted to receive the arbitration token from the first control module, store the arbitration token in the pending requests queue of the second control module, and determine whether the second process control entity is available to be acquired by the first process control entity, the second control module allowing the first process control entity to acquire ownership over the second process control entity when the second control module determines that the second process control entity is available to be acquired by the first process control entity, moving the arbitration token to the owned by queue of the second control module, and sending a copy of the arbitration token back to the first control module in an acquisition response message indicating that the second control module has allowed the first process control entity to acquire the second process control entity.

2. The system of claim 1 wherein the second control module determines whether the second process control entity is available to be acquired by the first process control entity by determining whether an arbitration token from a third control module is stored in the owned by queue of the second control module, indicating that the second process control entity has been acquired by a process control entity to which the third control module corresponds and is not available to be acquired by the first process control entity to which the first control module corresponds.

3. The system of claim 1 wherein the second control module allows the first process control entity to acquire ownership of the second process control entity when the second process control entity is available to be acquired and the arbitration token associated with the request from the first control module to acquire the second process control entity is in a foremost position in the pending requests queue of the second control module.

4. The system of claim 3 wherein the arbitration token associated with the request from the first control module for the first process control entity to acquire ownership of the second process control entity includes a priority indicator, and wherein the second control module allows the first process control entity to acquire the second process control entity when the second process control entity is available to be acquired and the data associated with the request from the first control module has a priority indicator indicating a priority higher than a priority associated with an arbitration token stored in the pending requests queue of the second control module associated with a request to acquire the second process control entity received from any other control module.

5. The system of claim 1 wherein the arbitration token includes data identifying the first control module as the source of an acquisition request and the second control module as the destination of the acquisition request.

6. The system of claim 1 wherein, upon receiving the acquisition response message from the second control module, the first control module is adapted to move the copy of the arbitration token from the pending acquisitions queue of the first control module to the owned equipment queue of the first control module.

7. The system of claim 1 wherein the owned by queue of the second control module is limited to holding a single arbitration token at a time such that the second process control entity to which the second control module corresponds may only be acquired by one process control entity at a time.

8. The system of claim 1 wherein the owned by queue of the second control module is limited to holding a defined number arbitration tokens such that the second process control entity to which the second control module corresponds may be acquired by the defined number of other process control entities at one time.

9. The system of claim 1 further comprising an external application adapted to communicate a request to acquire ownership of the second process control entity on behalf of another process control entity in advance of a time when the other process control entity needs to acquire ownership of the second process control entity in order to reserve a position within the pending requests queue of the second control module so that the second process control entity will be available to be acquired at a later time when the other process control entity needs to acquire ownership of the second process control entity.

10. The system of claim 1 wherein the second control module determines that the second process control entity is available to be acquired by the first process control entity only after the second process control entity has successfully acquired ownership over one or more other process control entities.

11. A distributed arbitration system in a process control system that includes a plurality of process control devices, the distributed arbitration system comprising:
a plurality of software objects corresponding to the plurality of process control devices, the software objects defining ownership arbitration queues for storing arbitration data associated with the corresponding control devices including a first software object defining a pending acquisitions queue and an owned equipment queue and a second software object defining a pending requests queue and an owned-by queue;

one or more processors for executing the software objects, the software objects configured such that when executed by the one or more processors the software objects arbitrate ownership requests amongst themselves, the first software object adapted to generate arbitration data in the form of an arbitration token when a first process control device corresponding to the first software object attempts to acquire a second process control device corresponding to the second software object, the first software object adapted to store a copy of the arbitration token in the pending acquisitions queue and adapted to communicate a copy of the arbitration token to the second software object, and the second software object is adapted to receive the copy of the arbitration token and store the copy of the arbitration token in the pending requests queue, wherein the second software object itself determines whether the second process control device may be acquired by the first process control device and, upon making a determination that the second process control device may be acquired by the first process control device, the second software object sending a copy of the arbitration token back to the first software object in a confirmation message indicating that the second software object has allowed the first process control entity to acquire the second process control entity.

12. The distributed arbitration system of claim 11 wherein the ownership queues defined by the first software object corresponding to the first process control device further include an owned equipment queue for storing arbitration data relating to other process control devices over which the first process control device has acquired ownership.

13. The distributed arbitration system of claim 11 wherein the ownership arbitration queues defined by the first software object corresponding to the first process control device include an owned-by queue for storing arbitration data relating to a third software object corresponding to a third process control device that has acquired ownership of the process control device corresponding to the first software object.

14. The distributed arbitration system of claim 11 wherein the second software object determines whether the second process control device is available to be acquired by the first process control device by determining whether there is space to store a copy of the arbitration token in the owned-by queue, and upon determining that there is space to store a copy of the arbitration token in the owned-by queue, the second software object is further adapted to move the copy of the arbitration token received from the first software object from the pending request queue to the owned-by queue.

15. The distributed arbitration system of claim 14 wherein upon receiving the confirmation message from the second software object, the first software object is further adapted to move the copy of the arbitration token from the pending acquisitions queue to the owned-equipment queue.

16. The distributed arbitration system of claim 15 wherein, when the first process control device no longer requires ownership of the second process control device, the first software object is adapted to communicate a release message to the second software object, and wherein, upon receiving the release message, the second software object is adapted to delete the arbitration token from the owned-by queue, and communicate a release confirmation message to the first software object, and, upon receiving the release confirmation message, the first software object is adapted to delete the copy of the arbitration token from the owned-equipment queue.

17. The distributed arbitration system of claim 14 wherein the owned-by queue is adapted to store a single arbitration token, and wherein the second software object is adapted to determine that the second process control device is available to be acquired by the first process control device when the owned-by queue is empty.

18. The distributed arbitration system of claim 14 wherein the owned-by queue is adapted to store a defined number of arbitration tokens, and wherein the second software object is adapted to determine that the second process control device is available to be acquired by the first process control device when there are fewer than the defined number arbitration tokens stored in the owned-by queue.

19. The distributed arbitration system of claim 11 wherein the arbitration token includes an acquisition priority, and wherein the second software object is adapted to determine that the second process control device is available to be acquired by the first process control device when the arbitration token generated by the first software object has a higher acquisition priority than any other arbitration tokens stored in the pending requests queue and has been stored in the pending request queue longer than any other arbitration token stored in the pending requests queue having the same acquisition priority.

20. The distributed arbitration system of claim 11 further comprising an external application executed by the one or more processors, the external application adapted to generate a second arbitration token on behalf of a third process control device for acquiring the second process control device at some time in the future, and to communicate the second arbitration token to the second software object, wherein the second software object stores the second arbitration token in the pending requests queue, whereby the third process control device may acquire the second process control device at the future time.

21. A method of arbitrating ownership of a first process control entity over a second process control entity comprising:

the first process control entity requesting ownership of the second process control entity by sending a first arbitration token to the second process control entity and storing a copy of the first arbitration token in a pending acquisitions queue of the first process control entity;

the second process control entity storing the first arbitration token in a pending requests queue of the second process control entity and determining whether the second process control entity is available to be acquired by the first process control entity;

the second process control entity submitting to the acquisition of the second process control entity by the first process control entity by moving the first arbitration token from the pending requests queue of the second process control entity to an owned by queue of the second process control entity when the second process control entity determines that it is available to be acquired by the first process control entity; and the second process control entity sending a copy of the first arbitration token to the first process control entity in a message indicating that the second process control entity has submitted to the acquisition of the second process control entity by the first process control entity.

22. The method of claim 21 wherein the second process control entity determining whether the second process control entity is available to be acquired by the first process control entity comprises evaluating the owned-by queue of with the second process control entity to determine whether another arbitration token associated with a third process control entity is stored in the owned-by queue of the second process control entity.

23. The method of claim 22 wherein the second process control entity submitting to the acquisition of the second process control entity by the first process control entity comprises moving the first arbitration token from the pending request queue of the second process control entity to the owned-by queue of the second process control entity.

24. The method of claim 23 further comprising confirming successful acquisition of the second process control entity by the first process control entity.

25. The method of claim 24 further comprising storing a copy of the first arbitration token in an owned-equipment queue associated with the first process control entity following confirmation of the successful acquisition of the second process control entity by the first process control entity.

26. The method of claim 24 further comprising the first process control entity relinquishing ownership of the second process control entity when a process task requiring the first process control entity to acquire ownership of the second process control entity is complete.

27. The method of claim 26 wherein the first process control entity relinquishing ownership of the second process control entity comprises deleting the copy of the first arbitration token stored in the owned-by queue associated with the second process control entity, so that the second process control entity may be acquired by another process control entity.

28. The method of claim 21 further comprising assigning a priority to the first arbitration token, the second process control entity submitting to the acquisition of the second process control entity by the first process control entity when the first arbitration token stored in the pending requests queue of the second process control entity has the highest priority of all arbitration tokens stored in the pending requests queue of the second process control entity, and has been stored in the pending requests queue longer than any other arbitration tokens stored in the pending requests queue of the second process control entity having the same priority.

29. The method of claim 21 further comprising reserving a place in the pending requests queue of the second control entity for receiving an arbitration token in the future, such that a process control entity may acquire the second process control entity at some time in the future.

30. A method of implementing a distributed equipment ownership arbitration system in a process control system that includes a plurality of process control devices and in which one or more of the process control devices must exercise ownership over one or more other process control devices to perform one or more process related tasks, the method comprising:
    implementing a plurality of control modules associated with the process control devices, the control modules defining arbitration queues for storing arbitration data relating to ownership of the process control devices with which the control modules are associated;
    generating an arbitration token at a first control module associated with a request by the first control module for a process control device associated with the first control module to acquire a process control device associated with a second control module;
    storing a copy of the arbitration token in a pending acquisitions queue defined by the first control module,
    sending the request to acquire the process control device associated with the second control module from the first control module to the second control module, the request including the arbitration token;
    storing the arbitration token in a pending requests queue defined by the second control module;
    determining whether the process control device associated with the second control module is available to be acquired by the process control device associated with the first control module;
    moving the arbitration token from the pending requests queue defined by the second control module to an owned by queue defined by the second control module indicating that the process control device associated with the second control module has been acquired by the process control device associated with the first control module; and
    sending a copy of the arbitration token back to the first control module in a message indicating that the process control device associated with the first control module has acquired the second control module.

31. The method of claim 30 wherein the owned by queue defined by the second control module includes a finite number of positions, and wherein determining whether the process control device with which the second control module is associated is available to be acquired comprises determining whether there are any open positions in the owned by queue in which an arbitration token has not been stored.

32. The method of claim 31 wherein the owned by queue includes a single position for receiving a single arbitration token such that the second process control device with which the second control module is associated may only be acquired by one process control device at a time.

33. The method of claim 30 further comprising:
    assigning a priority value to the arbitration token generated by the first control module; and
    moving the arbitration token from the pending requests queue defined by the second control module to the owned by queue defined by the second control module when the second process control device is available to be acquired and the arbitration token has the highest priority value of all arbitration tokens stored in the pending requests queue defined by the second control module.

34. The method of claim 33 further comprising storing a copy of the arbitration token in the owned equipment queue defined by the first control module indicating that the first process control device has acquired ownership of the second process control device.

35. The method of claim 30 further comprising the second process control device acquiring ownership over one or more other process control devices, and wherein determining whether the second process control device is available to be acquired by the first process control device comprises determining whether the second process control device has successfully acquired ownership of the one or more other process control devices.

36. The method of claim 30 further comprising reserving a position in the pending requests queue defined by the second control module, whereby the second control module may receive an arbitration token from a control module in the future when a process control device with which the control module is associated needs to acquire the second process control device.

* * * * *

UNITED STATES PATENT AND TRADEMARK OFFICE
CERTIFICATE OF CORRECTION

PATENT NO. : 8,127,063 B2  
APPLICATION NO. : 12/356385  
DATED : February 28, 2012  
INVENTOR(S) : Godfrey R. Sherriff et al.

It is certified that error appears in the above-identified patent and that said Letters Patent is hereby corrected as shown below:

In the Specification:

At Column 11, line 31, "rector" should be -- reactor --.

At Column 15, lines 51-52, "is be returned" should be -- is returned --.

Signed and Sealed this
Sixteenth Day of July, 2013

Teresa Stanek Rea
*Acting Director of the United States Patent and Trademark Office*